United States Patent [19]

Kataoka

[11] Patent Number: 4,673,919
[45] Date of Patent: Jun. 16, 1987

[54] MANUAL CONTROL DEVICE
[75] Inventor: Isaburou Kataoka, Nagasaki, Japan
[73] Assignee: Mitsubishi Denki Kabushiki Kaisha, Tokyo, Japan
[21] Appl. No.: 632,034
[22] Filed: Jul. 18, 1984
[30] Foreign Application Priority Data
  Aug. 10, 1983 [JP] Japan ................... 58-147513
[51] Int. Cl.$^4$ .................. G06F 3/14; G05B 11/01
[52] U.S. Cl. .................. 340/365 A; 340/365 R; 340/709; 340/711; 340/789; 340/722; 200/56 R
[58] Field of Search ............... 340/365 A, 365 R, 709, 340/711, 722, 789, 365 S; 200/56 R; 116/321

[56] References Cited

U.S. PATENT DOCUMENTS 4,313,113  1/1982  Thornburg .................. 340/365 A
4,367,436  1/1983  Arnichand et al.

OTHER PUBLICATIONS

Harrod, R. D., Touch-Pressure Sensitive Frequency-Modulated Keyboard, in IBM Technical Disclosure Bulletin, vol. 20, No. 10 (Mar. 1978), 4039-4040.

Primary Examiner—James L. Rowland
Assistant Examiner—Ted Rittmaster
Attorney, Agent, or Firm—Leydig, Voit & Mayer

[57] ABSTRACT

Improvements in a manual control device wherein an incremental touch key or a decremental touch key is depressed by hand so as to bring a manipulated value and a set value into agreement. The manual control device comprises a pressure sensor which converts a contact pressure of a hand into a voltage level which is proportional to the pressure, a level encoder which delivers a pulse at any one of a plurality of different frequencies to a counter in correspondence with the output of the pressure sensor, a D/A converter which converts a digital output of the counter into an analog output, and an output driver which controls a base current of a transistor for driving a manipulated-value indicator, by the A.C. output of the D/A converter.

3 Claims, 5 Drawing Figures

MANUAL CONTROL DEVICE

BACKGROUND OF THE INVENTION

The present invention relates to a manual control device for adjusting the control of various manipulated variables by the touch of a hand.

Heretofore, as a device of this type there has been used a control device as shown in FIG. 1. Referring to the figure, a main body of a manual control device 10 is provided with a set value indicator (SV indication) 12 for indicating desired values and a manipulated value indicator (MV indication) 13 for indicating the present value, by which the set value and the manipulated value are respectively indicated in the form of a bar graph. The main body 10 is also provided with an incremental touch key 14 and a decremental touch key 15 for the manipulated-value indicating bar 13. When the touch key 14 or 15 is activated by a hand or a finger, the indicated value on the indication bar 13 is increased or decreased, that is raised or lowered, respectively. Further, the main body 10 is provided with an acceleration touch key 16. When one of the touch key 14 or 15 is touched simultaneously with this acceleration touch key 16, the changing rate of the indication bar 13 is increased or decreased, respectively.

According to the construction of FIG. 1, in a case where the present value of the manipulated value greatly deviates from the desired value of the set value, in order to bring the manipulated value on the indication bar 13 into agreement with the set value on the indication bar 12, the incremental touch key 14 or the decremental touch key 15, is simultaneously activated with the acceleration touch key 16 to accelerate the adjustment of the manipulated value towards the setting of the set value. When the manipulated value has come close to the set value, the hand is released from the acceleration key 16 while either the touch key 14 or 15 is held activated until the manipulated value indicated by the indication bar 13 agrees with the set value indicated by the indication bar 12.

Since the prior-art device is constructed and operated as described above, the acceleration touch key 16 which is separate from the ordinary touch keys 14 and 15 must be disadvantageously provided in order to change the manipulated value at a high rate. Another disadvantage is that, when the key 14 or 15 is activated, the key 16 must also be simultaneously touched, and the operator is sometimes forced to use both his hands.

SUMMARY OF THE INVENTION

The present invention has the objective to eliminate the disadvantages of the prior-art device as stated above, and has for its main object to provide a novel manual control device in which, by the mere depression of an incremental touch key or a decremental touch key by hand, a variable acceleration or deceleration can be achieved to quickly bring a manipulated value into agreement with a set value.

In order to accomplish the above object, the manual control device of the present invention comprises a pressure sensor which converts the contact pressure of a hand into a voltage level proportional to this pressure, first means for providing output pulses having any one of a plurality of different frequencies, the frequencies of the output pulses corresponding to the analog output level of the pressure sensor, a counter for counting the output pulses, and second means for driving the manipulated value indicator in accordance with the signal from the counter. The output pulses from the first means are generated by utilizing an arrangement including a level encoder which generates digital signals corresponding to the voltage levels of the analog outputs of the pressure sensor, pulse generators which are associated with the respective digital signals of the level encoder, and AND gates which receive the digital signals and frequency signals from the level encoder and the pulse generators, respectively, and whose output terminals are interconnected.

The level encoder includes an input terminal which receives the analog output from the pressure sensor, first and second comparators whose inverting input terminals are commonly connected to the aforementioned input terminal, a low-level output terminal which is connected to an output terminal of the first comparator, a medium-level output terminal which is connected to the output terminal of an AND gate a first input of which is connected to the output terminal of the first comparator through an inverter and the second input of which is connected to an output terminal of the second comparator, and a high-level output terminal which is connected to the output terminal of the second comparator through an inverter, the non-inverting input terminal of the first comparator being set at a reference level lower than that of the non-inverting input terminal of the second comparator.

The arrangement of the invention results in the provision of a multi-stage speed control of a manual control device.

DETAILED DESCRIPTION OF THE PREFERRED EMBODIMENT

Figure 1:
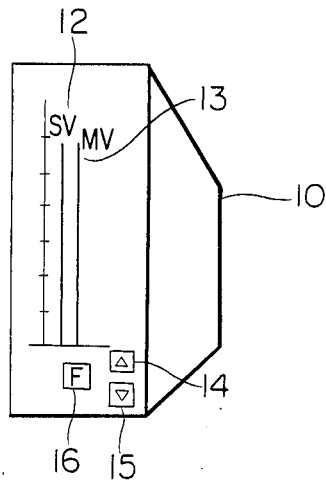
FIG. 1 is a front view showing a prior-art manual control device.

Now, an embodiment of the present invention will be described with reference to the drawings. The same portions as in the prior-art device described above are assigned the same symbols in the drawings, and shall not be repeatedly explained.

Figure 2:
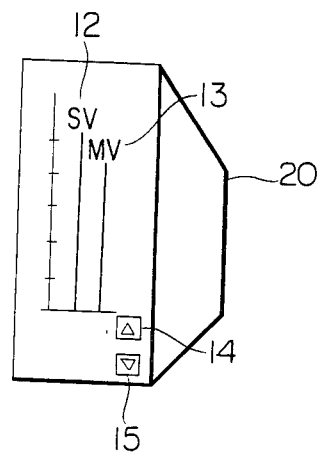
FIG. 2 is a front view showing an embodiment of a main body of a manual control device according to the present invention.

FIG. 2 shows a main body of a manual control device 20 according to the present invention. As apparent from the illustration, the acceleration touch key 16 in the prior-art device of FIG. 1 is not disposed.

Figure 3:
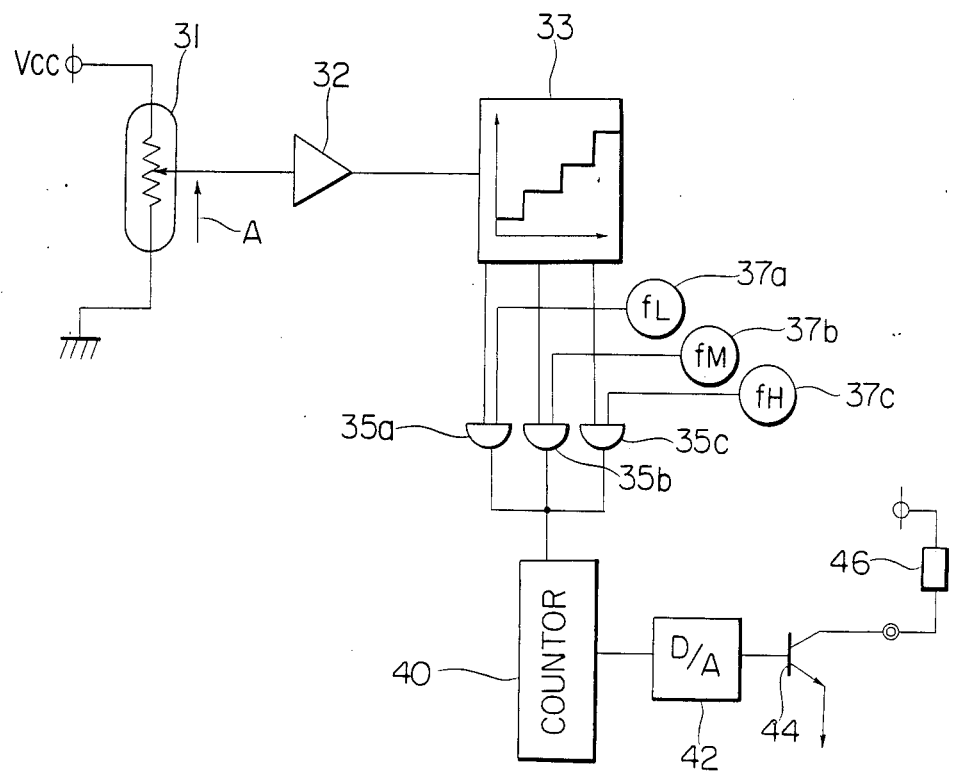
FIG. 3 is a circuit diagram showing the internal arrangement of the embodiment in FIG. 2.

FIG. 3 schematically depicts a control circuit in the manual control device of FIG. 2. Referring to FIG. 3, reference numeral 31 designates a pressure sensor, having first and second terminals thereof connected to Vcc and ground respectively, which when activated by hand, causes its resistance to increase as indicated by an arrow A in the drawing, so that the output voltage therefrom increases linearly as a function of the hand pressure. It is to be noted, therefore, that the touch keys 14 and 15 are respectively and separately connected to the same control circuit as shown in FIG. 3. The pressure sensor 31 is connected to a level encoder 33 through an amplifier 32. As will be explained later, the level encoder 33 turns its outputs "ON" or "OFF" in accordance with an input value so that only one output thereof is turned "ON" at any given time. The outputs of the level encoder 33 are connected to respective first inputs of AND gates 35a, 35b, and 35c the respective second inputs of which are connected to pulse generators 37a, 37b and 37c. The outputs of the AND gates 35a, 35b, and 35c are interconnected and also connected to the input of a counter 40. The pulse generators 37a, 37b, and 37c generate three different frequencies corresponding to different voltage levels from the sensor 31 via the amplifier 32, namely low, medium, and high, respectively. Accordingly, depending on which of the outputs from the encoder 33 is high will determine which pulse frequency of the frequency generators is inputted to the counter 40. Further, the output data of the counter 40 is applied to a D/A converter 42, and the base current of a load transistor 44 is controlled by an output driver 46 on the basis of a D/A converted value of the D/A converter 42. As can be seen, the D/A converter 42 will produce a voltage depending on the pulses counted by the counter. In accordance with the operation of the load transistor 44 and depending on the voltage across the base, a corresponding voltage drop across the output driver 46 will change the present value on the manipulated value indicator 13.

Next, the operation of the above circuit will be described.

When the touch key 14 or 15 in FIG. 2 is depressed by hand, the output level of the pressure sensor 31 is determined by the contact pressure of the hand on the touch key 14 or 15. The contact pressure is converted in the sensor 31 into a voltage level proportional to the contact pressure. The output of the pressure sensor 31 is then amplified by the amplifier 32, and one output of the level encoder 33 is turned "ON" in accordance with the output level of the amplifier 32. By way of example, assuming that the key 14 is depressed and that the gate 35c is turned "ON" by the corresponding output of the encoder 33, the high-rate pulse from the pulse generator 37c is fed into the counter 40 through the gate 35c.

In this case, the incremental touch key 14 in FIG. 2 is in its most depressed position due to pressure applied by a hand, and the manipulated variable is in its most accelerated state. The counter 40 is similarly supplied with the medium-rate pulse when the gate 35b is "ON", or with the low-rate pulse when the gage 35a is "ON". The resulting output of the counter 40 is directly D/A-converted by the D/A converter 42, the output of which is applied to the output driver 44 that controls the base current of the transistor 46 so as to vertically move the indication bar 13.

Figure 4:
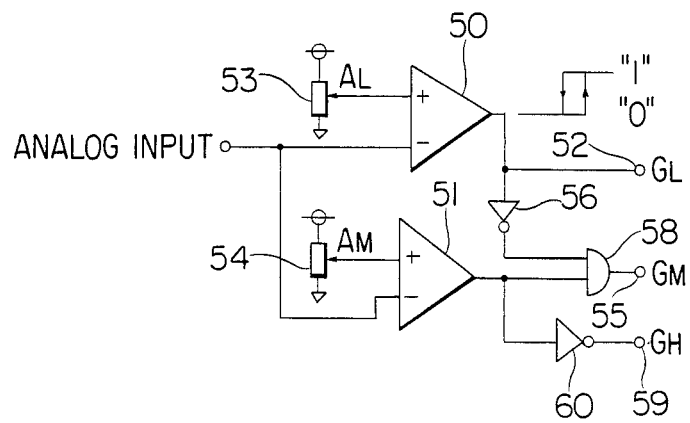
FIGS. 4 and 5 are diagrams for explaining a level encoder included in the embodiment in FIG. 3.

Now, the arrangement of the level encoder 33 will be described. As shown in FIG. 4, the level encoder 33 includes two comparators 50 and 51, the non-inverting input terminals of which are respectively connected to set points of reference voltage setting units 53 and 54. The set point of the setting unit 53 is set at a voltage which is lower in level than the voltage of the set point of the setting unit 54. The inverting input terminals of the comparators 50 and 51 are connected in common to the input terminal of the level encoder 33 so as to receive the analog signal from the amplifier 32. The output terminal of the comparator 50 is connected to a low-level output terminal 52 so as to provide as an output a logic signal $G_L$. The output terminal of the comparator 50 is also connected to one input of an AND gate 58 through an inverter 56. The output terminal of the comparator 51 is connected to the other input of the AND gate 58, the output terminal of which is connected to a medium-level output terminal 55 so as to provide as an output a logic signal $G_M$. Further, the output terminal of the comparator 51 is also connected to a high-level output terminal 59 through an inverter 60 so as to provide as an output a logic signal $G_H$. The operation of the level encoder will be described herebelow.

Figure 5:
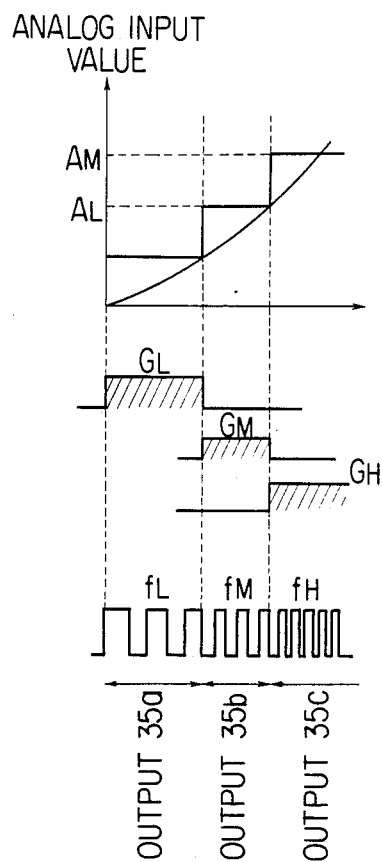

Assuming that an analog signal has now been applied from the pressure sensor 31 via the amplifier 32 to the level encoder 33, and that this analog signal is lower than the set level of the setting unit 53 connected to the non-inverting input terminal of the comparator 50, the logic "high" signal $G_L$ is provided from the low-level output terminal 52, and a low-frequency pulse signal $f_L$ shown in FIG. 5 is sent to the counter 40 through the AND gate 35a.

In a case where the analog input signal is higher than the set level of the setting unit 53 and lower than that of the setting unit 54, the output signal of the comparator 50 becomes logic "low", and a logic "high" signal is applied to the AND gate 58 via the inverter 56, while at the same time a logic "high" signal is provided as an output from the comparator 51. Therefore, the logic "high" signal $G_M$ is provided from the medium-level output terminal 55, and a medium-frequency pulse signal $f_M$ shown in FIG. 5 is sent to the counter 40 through the AND gate 35b.

In a case where the analog input signal is further higher than the set level of the setting unit 54, the output signal of the comparator 51 becomes logic "low", and the logic "high" signal $G_H$ is delivered to the high-level output terminal 59 via the inverter 60 so that a high-frequency pulse signal $f_H$ shown in FIG. 5 is sent to the counter 40 through the AND gate 35c.

While the foregoing embodiment has included three frequencies of pulses at the high, medium and low rates, it is a matter of course that two frequencies or four or more frequencies of pulses may well be included.

As set forth above, the present invention permits an analog operation control proportional to a contact pressure on an incremental or decremental touch key, and it produces the effect that a manipulated variable can be controlled at three stages by the operation of only one hand and at a desired acceleration.

It should be noted that although a three-stage operation is disclosed, the present invention is not to be limited thereto and two or four or more stages may be easily realized by those skilled in the art without departing from the gist of the invention.

It will be obvious to those skilled in the art that the present invention is not limited to the foregoing embodiment, but that various modifications are possible within the scope of the idea of the present invention.

What we claim is:

1. A manual control device wherein an incremental touch key is depressed by hand so as to bring into agreement a manipulated value and a set value displayed on a manipulated value indicator and a set value indicator, respectively, said control device comprising:
   a pressure sensor for converting a hand contact pressure on the touch key into a voltage level proportional to this pressure,
   first means for providing output pulses,
   said first means including a level encoder for generating digital signals corresponding to the voltage level of said pressure sensor, pulse generators for generating frequency signals having different frequencies, and AND gates receiving and logically correlating the digital and frequency signals for providing output pulses of a frequency determined by the correlation, the output pulses having one of a plurality of different frequencies which vary in predetermined discrete steps, each one of the different frequencies corresponding to a range of voltage levels of said pressure sensor, a counter for counting the output pulses of said first means and for producing a digital output signal, and second means for driving the manipulated value indicator in accordance with the digital output signal from said counter.

2. A manual control device according to claim 1 wherein said level encoder includes an input terminal for receiving said voltage level from said pressure sensor, first and second comparators having inverting input terminals connected in common to said input terminal, a alow-level output terminal connected to an output terminal of said first comparator, a medium-level output terminal connected to an output terminal of an AND gate connected to said output terminal of said first comparator through an inverter and to an output terminal of said second comparator, and a high-level output terminal connected to said output terminal of said second comparator through an inverter, the non-inverting input terminal of said first comparator being set at a reference level lower than that of the non-inverting input terminal of said second comparator.

3. A manual control device according to claim 2 wherein said second means includes a D/A converter connected to said counter for converting an output signal from said counter into an analog output signal, a transistor having a base connected to said D/A converter, and an output driver for driving said manipulated value indicator in accordance with an output at a collector of said transistor.

* * * * *